United States Patent
Park

(10) Patent No.: US 9,614,441 B2
(45) Date of Patent: Apr. 4, 2017

(54) DC-DC CONVERTER AND ORGANIC LIGHT EMITTING DISPLAY DEVICE INCLUDING THE SAME

(71) Applicant: SAMSUNG DISPLAY CO., LTD., Yongin, Gyeonggi-Do (KR)

(72) Inventor: Sung-Chun Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 79 days.

(21) Appl. No.: 14/622,720

(22) Filed: Feb. 13, 2015

(65) Prior Publication Data

US 2015/0244267 A1    Aug. 27, 2015

(30) Foreign Application Priority Data

Feb. 25, 2014  (KR) .................. 10-2014-0021896

(51) Int. Cl.
  *G09G 3/3233* (2016.01)
  *H02M 3/158* (2006.01)
  *G09G 3/3258* (2016.01)

(52) U.S. Cl.
  CPC .......... *H02M 3/158* (2013.01); *G09G 3/3233* (2013.01); *G09G 3/3258* (2013.01); *H02M 3/1588* (2013.01); *G09G 2330/00* (2013.01); *G09G 2330/028* (2013.01); *G09G 2360/08* (2013.01); *Y02B 70/1466* (2013.01)

(58) Field of Classification Search
  CPC .. H02M 3/158; H02M 3/1588; G09G 3/3258; G09G 3/3233; G09G 2360/08; G09G 2330/00; G09G 2330/028; Y02B 70/1466
  See application file for complete search history.

(56) References Cited

U.S. PATENT DOCUMENTS

| 8,154,482 | B2 | 4/2012 | Lee et al. |
| 2010/0033467 | A1 | 2/2010 | Park |
| 2011/0080338 | A1 | 4/2011 | Berkay et al. |
| 2011/0242087 | A1* | 10/2011 | Ebisuno ............... G09G 3/3233 345/212 |

(Continued)

FOREIGN PATENT DOCUMENTS

| KR | 10-2006-0097378 A | 9/2006 |
| KR | 10-2009-0117229 A | 11/2009 |

(Continued)

*Primary Examiner* — Shaheda Abdin
(74) *Attorney, Agent, or Firm* — Lewis Roca Rothgerber Christie LLP

(57) ABSTRACT a DC-DC converter, including a conversion unit configured to convert a battery voltage input to an input terminal of the DC-DC converter into a first voltage, and to output the first voltage to an output terminal of the DC-DC converter, a feedback voltage generation unit configured to generate a feedback voltage by dividing the first voltage, an error amplifier (AMP) configured to supply, to a pulse width modulation (PWM) control circuit, an error signal indicating a voltage difference between the feedback voltage and a reference voltage, the PWM control circuit being configured to control the conversion unit, corresponding to the error signal, thereby changing the first voltage, and a reference voltage supply unit configured to supply the reference voltage to the error AMP, and to change the reference voltage.

19 Claims, 4 Drawing Sheets

(56) References Cited

U.S. PATENT DOCUMENTS

2011/0273427 A1    11/2011    Park

FOREIGN PATENT DOCUMENTS

| KR | 10-2010-0018254 A | 2/2010 |
| KR | 10-0952834 B1 | 4/2010 |
| KR | 10-2010-0139089 A | 12/2010 |
| KR | 10-2011-0123008 A | 11/2011 |

* cited by examiner

US 9,614,441 B2

DC-DC CONVERTER AND ORGANIC LIGHT EMITTING DISPLAY DEVICE INCLUDING THE SAME

CROSS-REFERENCE TO RELATED APPLICATION

This application claims priority to and the benefit of Korean Patent Application No. 10-2014-0021896, filed on Feb. 25, 2014, in the Korean Intellectual Property Office, the entire content of which is incorporated herein by reference in its entirety.

BACKGROUND

1. Field

An aspect of an embodiment of the present invention relates to a DC-DC converter and an organic light emitting display device including the same.

2. Description of the Related Art

Recently, there have been developed various types (e.g., kinds) of flat panel displays capable of reducing undesirable characteristics of cathode ray tubes such as weight and volume. Examples of flat panel displays include a liquid crystal display, a field emission display, a plasma display panel, an organic light emitting display, and the like.

Among these flat panel displays, the organic light emitting display displays images using (e.g., utilizing) organic light emitting diodes that emit light through recombination of electrons and holes. The organic light emitting display has a fast response speed and concurrently (e.g., simultaneously) displays a clear image.

The organic light emitting display includes a DC-DC converter configured to generate a voltage required in driving the organic light emitting display by converting an external voltage.

As the organic light emitting display has been widely employed in mobile devices and the like having batteries, it is desirable to improve the efficiency of the DC-DC converter.

SUMMARY

According to an aspect of an embodiment of the present invention, there is provided a DC-DC converter, including: a conversion unit configured to convert a battery voltage input to an input terminal of the DC-DC converter into a first voltage, and to output the first voltage to an output terminal of the DC-DC converter; a feedback voltage generation unit configured to generate a feedback voltage by dividing the first voltage; an error amplifier (AMP) configured to supply, to a pulse width modulation (PWM) control circuit, an error signal indicating a voltage difference between the feedback voltage and a reference voltage, the PWM control circuit being configured to control the conversion unit, corresponding to the error signal, thereby changing the first voltage; and a reference voltage supply unit configured to supply the reference voltage to the error AMP, and to change the reference voltage.

In an embodiment, the reference voltage supply unit includes: an internal voltage generation unit configured to generate an internal voltage by dividing the battery voltage; a selection control unit configured to receive the internal voltage from the internal voltage generation unit, and to output a selection signal corresponding to a level of the internal voltage; and a selection unit configured to receive a plurality of auxiliary voltages, to select one auxiliary voltage of the plurality of auxiliary voltages corresponding to the selection signal as a reference voltage, and to supply the reference voltage to the error AMP.

In an embodiment, the reference voltage supply unit further includes an auxiliary voltage generation unit configured to generate a plurality of auxiliary voltages by dividing a specific voltage, and to supply the generated auxiliary voltages to the selection unit.

In an embodiment, the internal voltage generation unit includes: a first resistor coupled between the input terminal and a first node; a second resistor coupled between the first node and a second node; and a control transistor coupled between the second node and a ground.

In an embodiment, the reference voltage supply unit includes: an internal voltage generation unit configured to generate an internal voltage by dividing the battery voltage; a selection control unit configured to output a selection signal corresponding to an external control signal; and a selection unit configured to receive a plurality of auxiliary voltages, to select one auxiliary voltage of the plurality of auxiliary voltages corresponding to the selection signal as a reference voltage, and to supply the reference voltage to the error AMP.

In an embodiment, the internal voltage generation unit includes: a first resistor coupled between the input terminal and a first node; a second resistor coupled between the first node and a second node; and a control transistor coupled between the second node and a ground.

In an embodiment, the reference voltage supply unit further includes an auxiliary voltage generation unit including a plurality of ladder resistors coupled in series between the first node and a third node and a current source configured to supply a current to the third node, and configured to generate a plurality of auxiliary voltages.

In an embodiment, the selection control unit is configured to count a number of pulses in the external control signal and to output a selection signal corresponding to the number of pulses.

In an embodiment, the conversion unit includes: a first inductor coupled between the input terminal and a common node; a first transistor coupled between the common node and a ground; and a second transistor coupled between the common node and the output terminal.

According to an aspect of an embodiment of the present invention, there is provided an organic light emitting display device, including: a plurality of pixels coupled to scan lines and data lines; a DC-DC converter configured to supply a first voltage to the pixels; and a battery configured to supply a battery voltage to an input terminal of the DC-DC converter, wherein the DC-DC converter includes: a conversion unit configured to convert the battery voltage into the first voltage, and to output the first voltage to an output terminal of the DC-DC converter; a feedback voltage generation unit configured to generate a feedback voltage by dividing the first voltage; an error AMP configured to supply, to a PWM control circuit, an error signal indicating a difference between the feedback voltage and a reference voltage, the PWM control circuit being configured to control the conversion unit, corresponding to the error signal, and to change the first voltage during an initial driving period; and a reference voltage supply unit configured to supply the reference voltage to the error AMP, and to change the reference voltage during the initial driving period.

In an embodiment, the pixels are configured to maintain a non-emission state during the initial driving period.

In an embodiment, the reference voltage supply unit includes: an internal voltage generation unit configured to generate an internal voltage by dividing the battery voltage; a selection control unit configured to receive the internal voltage from the internal voltage generation unit, and to output a selection signal corresponding to a level of the internal voltage; and a selection unit configured to receive a plurality of auxiliary voltages, to select one auxiliary voltage of the plurality of auxiliary voltages corresponding to the selection signal as a reference voltage, and to supply the reference voltage to the error AMP.

In an embodiment, the reference voltage supply unit further includes an auxiliary voltage generation unit configured to generate a plurality of auxiliary voltages by dividing a specific voltage, and to supply the generated auxiliary voltages to the selection unit.

In an embodiment, the internal voltage generation unit includes: a first resistor coupled between the input terminal and a first node; a second resistor coupled between the first node and a second node; and a control transistor coupled between the second node and a ground, and configured to maintain an On state during the initial driving period.

In an embodiment, the reference voltage supply unit includes: an internal voltage generation unit configured to generate an internal voltage by dividing the battery voltage; a selection control unit configured to output a selection signal corresponding to an external control signal; and a selection unit configured to receive a plurality of auxiliary voltages, to select one auxiliary voltage of the plurality of auxiliary voltages corresponding to the selection signal as a reference voltage, and to supply the reference voltage to the error AMP.

In an embodiment, the internal voltage generation unit includes: a first resistor coupled between the input terminal and a first node; a second resistor coupled between the first node and a second node; and a control transistor coupled between the second node and a ground, and configured to maintain an On state during the initial driving period.

In an embodiment, the reference voltage supply unit further includes an auxiliary voltage generation unit includes a plurality of ladder resistors coupled in series between the first node and a third node and a current source configured to supply a current to the third node, and configured to generate a plurality of auxiliary voltages.

In an embodiment, the selection control unit is configured to count a number of pulses in the external control signal, and to output a selection signal corresponding to the number of pulses.

In an embodiment, the conversion unit includes: a first inductor coupled between the input terminal and a common node; a first transistor coupled between the common node and a ground; and a second transistor coupled between the common node and the output terminal.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it may be the only element between the two elements, or one or more intervening elements may also be present. Like reference numerals refer to like elements throughout.

DETAILED DESCRIPTION

Figure 1:
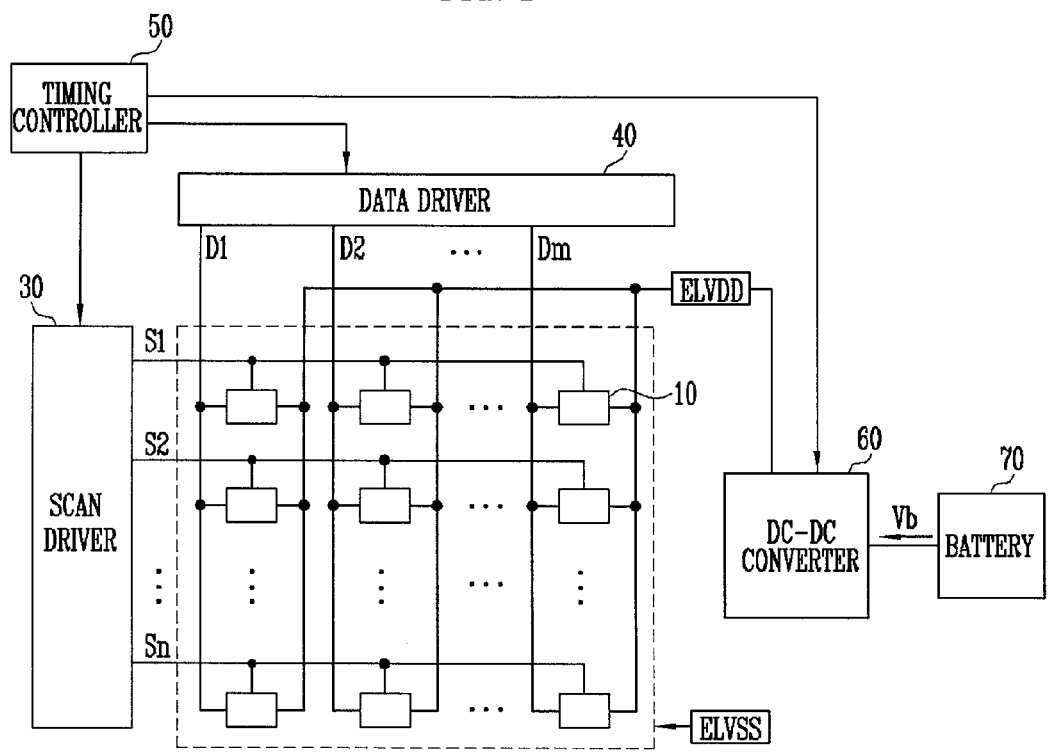
FIG. 1 is a schematic diagram illustrating an organic light emitting display device, according to an example embodiment of the present invention.

Hereinafter, certain example embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a schematic diagram illustrating an organic light emitting display device, according to an example embodiment of the present invention.

Referring to FIG. 1, the organic light emitting display device, according to one embodiment, includes a plurality of pixels 10 coupled to scan lines S1 to Sn and data lines D1 to Dm, a scan driver 30 configured to supply a scan signal to each pixel 10 through the scan lines S1 to Sn, a data driver 40 configured to supply a data signal to each pixel 10 through the data lines D1 to Dm, and a DC-DC converter 60 configured to supply a first voltage ELVDD to each pixel 10.

The organic light emitting display device, according to one embodiment, further includes a timing controller 50 configured to control the scan driver 30 and the data driver 40, and a separate DC-DC converter configured to supply a second voltage ELVSS to each pixel 10.

Each pixel 10 receiving the first voltage ELVDD and the second voltage ELVSS may generate light corresponding to the data signal in response to (e.g., in accordance with or by means of) current flowing from the first voltage ELVDD to the second voltage ELVSS via an organic light emitting diode.

The scan driver 30 may generate a scan signal under the control of the timing controller 50, and supply the generated scan signal to the scan lines S1 to Sn.

The data driver 40 may generate a data signal under the control of the timing controller 50, and supply the generated data signal to the data lines D1 to Dm.

When the scan signal is supplied to a specific scan line, pixels 10 coupled to the specific scan line may receive a data signal supplied from the data lines D1 to Dm, and accordingly, each pixel 10 may emit light corresponding to the supplied data signal.

The DC-DC converter 60 may generate the first voltage ELVDD by receiving a battery voltage Vb supplied from a battery 70 and converting the battery voltage Vb.

For example, the DC-DC converter 60 may be a boost type (e.g., a boosting) converter that generates the first voltage ELVDD by boosting the battery voltage Vb.

In this example, the first voltage ELVDD may have a voltage level higher than that of the battery voltage Vb.

The first voltage ELVDD may be set to a positive voltage, and the second voltage ELVSS may be set to a negative voltage.

The battery 70 may supply a battery voltage (e.g., a predetermined battery voltage) Vb to the DC-DC converter 60. For example, the battery 70 may be formed with a rechargeable secondary battery.

The battery voltage Vb output from the battery 70 may be changed. For example, the battery voltage Vb may be decreased as the organic light emitting display device is used (e.g., utilized). The battery voltage Vb may be increased by charging the battery 70.

When the level of the first voltage ELVDD is fixed even though the battery voltage Vb is changed, the efficiency of the DC-DC converter 60 may be considerably deteriorated.

Thus, the DC-DC converter 60, according to one embodiment, controls the level of the first voltage ELVDD by reflecting a change in the battery voltage Vb, so that it is possible to improve the efficiency of the DC-DC converter.

Figure 2:
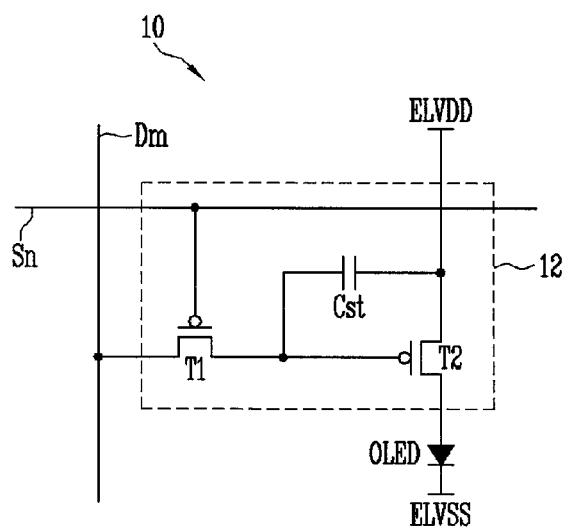
FIG. 2 is a circuit diagram illustrating an example of a pixel shown in FIG. 1, according to an example embodiment of the present invention.

FIG. 2 is a circuit diagram illustrating an example of the pixel shown in FIG. 1, according to an example embodiment of the present invention. For convenience of illustration, a pixel coupled to an n-th scan line Sn and an m-th data line is shown in FIG. 2.

Referring to FIG. 2, the pixel 10 may include an organic light emitting diode OLED, and a pixel circuit 12 coupled to the data line Dm and the scan line Sn to control the organic light emitting diode OLED.

An anode electrode of the organic light emitting diode OLED may be coupled to the pixel circuit 12, and a cathode electrode of the organic light emitting diode OLED may be coupled to the second voltage ELVSS.

The organic light emitting diode OLED generates light with a luminance (e.g., a predetermined luminance) corresponding to current supplied from the pixel circuit 12.

The pixel circuit 12 may control the amount of current supplied to the organic light emitting diode OLED, corresponding to a data signal supplied to the data line Dm when a scan signal is supplied to the scan line Sn. To this end, the pixel circuit 12 may include a second pixel transistor T2 coupled between the first voltage ELVDD and the organic light emitting diode OLED, a first pixel transistor T1 coupled between the second pixel transistor T2, the data line Dm and the scan line Sn, and a storage capacitor Cst coupled between a gate electrode and a first electrode of the second pixel transistor T2.

A gate electrode of the first pixel transistor T1 may be coupled to the scan line Sn, and a first electrode of the first pixel transistor T1 may be coupled to the data line Dm.

A second electrode of the first pixel transistor T1 may be coupled to one terminal of the storage capacitor Cst.

In one embodiment, the first electrode may be set as any one of source and drain electrodes, and the second electrode may be set as an electrode different from the first electrode.

For example, when the first electrode is set as the source electrode, the second electrode may be set as the drain electrode.

The first pixel transistor T1 coupled to the scan line Sn and the data line Dm is turned on when the scan signal is supplied from the scan line Sn, to supply the data signal supplied from the data line Dm to the storage capacitor Cst. Thus, the storage capacitor Cst may charge a voltage corresponding to the data signal.

The gate electrode of the second pixel transistor T2 may be coupled to the one terminal of the storage capacitor Cst, and the first electrode of the second pixel transistor T2 may be coupled to the other terminal of the storage capacitor Cst and the first voltage ELVDD. A second electrode of the second pixel transistor T2 may be coupled to the anode electrode of the organic light emitting diode OLED.

The second pixel transistor T2 may control the amount of current flowing from the first voltage ELVDD to the second voltage ELVSS via the organic light emitting diode OLED, the current corresponding to the voltage stored in the storage capacitor Cst.

Therefore, the organic light emitting diode OLED may generate light corresponding to the amount of current supplied from the second pixel transistor T2.

The pixel structure described in FIG. 2 is merely an example embodiment of the present invention, and therefore, the pixel 10 of the present invention is not limited to the pixel structure illustrated in FIG. 2. For example, the pixel circuit 12 has a circuit structure capable of supplying current to the organic light emitting diode OLED, and may be selected as any one of various structures known in the art.

Figure 3:
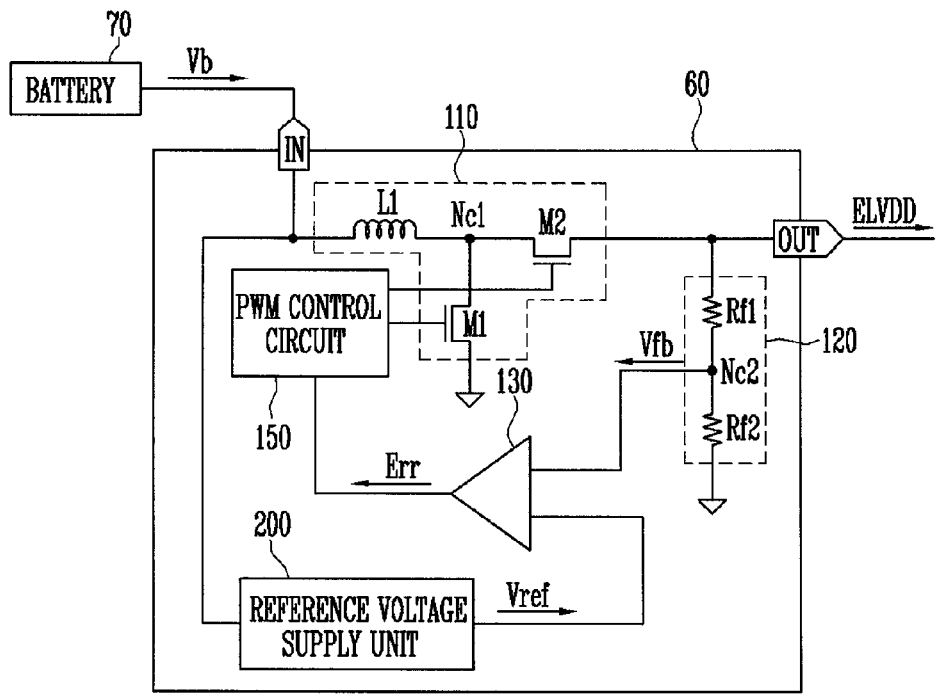
FIG. 3 is a schematic diagram illustrating a DC-DC converter, according to an example embodiment of the present invention.

FIG. 3 is a schematic diagram illustrating a DC-DC converter, according to an example embodiment of the present invention.

Referring to FIG. 3, the DC-DC converter 60, according to one embodiment, may include a conversion unit 110, a feedback voltage generation unit 120, an error amplifier (AMP) 130, a pulse width modulation (PWM) control circuit 150 and a reference voltage supply unit 200.

The conversion unit 110 may convert a battery voltage Vb supplied from an input terminal IN of the DC-DC converter 60 into a first voltage ELVDD, and output the first voltage ELVDD to an output terminal OUT of the DC-DC converter 60.

For example, the conversion unit 110 may generate the first voltage ELVDD by boosting the battery voltage Vb.

To this end, the conversion unit 110 may include a first inductor L1, a first transistor M1 and a second transistor M2.

The first inductor L1 may be coupled between the input terminal of the DC-DC converter 60 and a first common node Nc1.

The first transistor M1 may be coupled between the first common node Nc1 and a ground (e.g., a ground reference voltage source).

For example, a first electrode of the first transistor M1 may be coupled to the first common node Nc1, and a second electrode of the first transistor M1 may be coupled to the ground.

The second transistor M2 may be coupled between the first common node Nc1 and the output terminal OUT of the DC-DC converter 60.

For example, a first electrode of the second transistor M2 may be coupled to the first common node Nc1, and a second electrode of the second transistor M2 may be coupled to the output terminal OUT of the DC-DC converter 60.

In this example, the first common node Nc1 may be defined as a node to which the first transistor M1, the second transistor M2 and the first inductor L1 are commonly coupled.

The first electrode of the first or second transistor M1 or M2 may be set as any one of source and drain electrodes, and the second electrode of the first or second transistor M1 or M2 may be set as an electrode different from the first electrode. For example, when the first electrode is set as the drain electrode, the second electrode may be set as the source electrode.

The feedback voltage generation unit 120 may generate a feedback voltage Vfb by dividing the first voltage ELVDD.

The feedback voltage generation unit 120 may supply the generated feedback voltage Vfb to the error AMP 130.

For example, the feedback voltage generation unit 120 may include a first feedback resistor Rf1 and a second feedback resistor Rf2.

The first feedback resistor Rf1 may be coupled between the output terminal OUT and a second common node Nc2.

The second feedback resistor Rf2 may be coupled between the second common node Nc2 and the ground.

Accordingly, the feedback voltage Vfb may be output from the second common node Nc2.

The error AMP 130 may receive the feedback voltage Vfb input from the feedback voltage generation unit 120, and receive a reference voltage Vref from the reference voltage supply unit 200.

The error AMP 130 may supply, to the PWM control circuit 150, an error signal Err on which a difference between the feedback voltage Vfb and the reference voltage Vref is reflected.

The PWM control circuit 150 may control the conversion unit 110, corresponding to the error signal Err supplied from the error AMP 130.

In one embodiment, the PWM control circuit 150 controls the conversion unit 110, so that the first voltage ELVDD may be changed during an initial driving period.

For example, the PWM control circuit 150 may control switching operations of the transistors M1 and M2 included in the conversion unit 110, corresponding to the error signal Err.

In one embodiment, the PWM control circuit 150 controls the on-off operations of the first and second transistors M1 and M2, so that the duty ratio of each transistor M1 or M2 may be controlled, thereby changing the level of the first voltage ELVDD.

For example, when the level of the reference voltage Vref is increased, the difference between the feedback voltage Vfb and the reference voltage Vref is further decreased. This may be reported to the PWM control circuit 150 by the error signal Err of the error AMP 130.

Thus, the PWM control circuit 150 may control the conversion unit 110 to increase the first voltage ELVDD by reflecting the error signal Err.

When the level of the reference voltage Vref is decreased, the difference between the feedback voltage Vfb and the reference voltage Vref is further increased. This may be reported to the PWM control circuit 150 by the error signal Err of the error AMP 130.

Thus, the PWM control circuit 150 may control the conversion unit 110 to decrease the first voltage ELVDD by reflecting the error signal Err.

The reference voltage supply unit 200 may supply the reference voltage Vref to the error AMP 130.

The reference voltage supply unit 200 may change the level of the reference voltage.

For example, the reference voltage supply unit 200 may change the reference voltage Vref during the initial driving period in order to change the first voltage ELVDD during the initial driving period.

When the first voltage ELVDD is changed while the pixels 10 are performing emission operations, an image quality defect may occur.

Therefore, in one embodiment, all the pixels 10 maintain the non-emission state during the initial driving period in which the first voltage ELVDD is changed.

Figure 4:
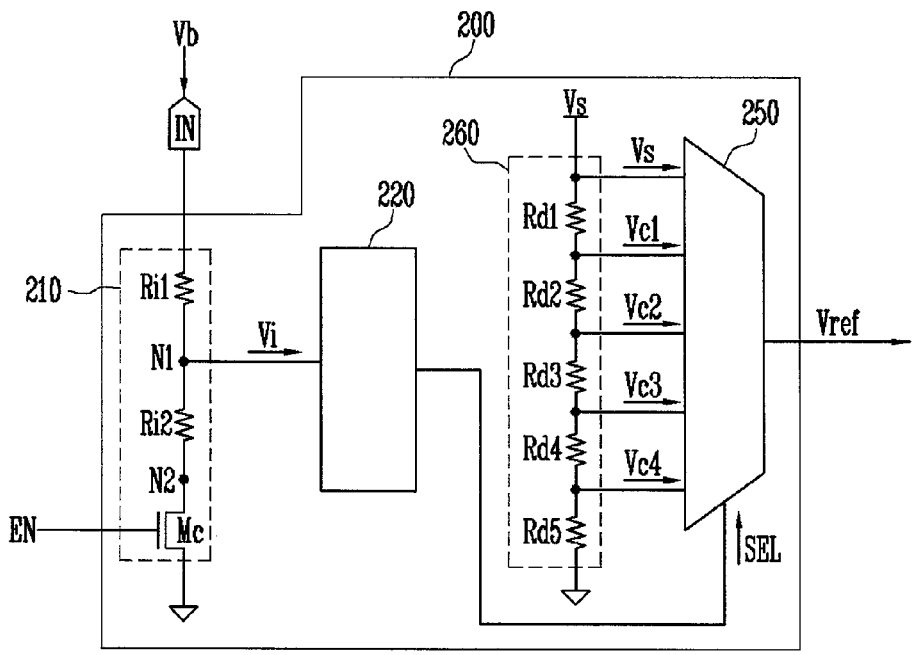
FIG. 4 is a schematic diagram illustrating a reference voltage supply unit, according to a first example embodiment of the present invention.

FIG. 4 is a schematic diagram illustrating a reference voltage supply unit, according to a first example embodiment of the present invention.

Referring to FIG. 4, the reference voltage supply unit 200, according to one embodiment, includes an internal voltage generation unit 210, a selection control unit 220, a selection unit 250 and an auxiliary voltage generation unit 260.

The internal voltage generation unit 210 may generate an internal voltage Vi by dividing the battery voltage Vb supplied to the input terminal IN of the DC-DC converter 60.

The internal voltage generation unit 210 may supply the generated internal voltage Vi to the selection control unit 220.

To this end, the internal voltage generation unit 210 may include a first resistor Ri1, a second resistor Ri2 and a control transistor Mc.

The first resistor Ri1 may be coupled between the input terminal IN of the DC-DC converter 60 and a first node N1.

The second resistor Ri2 may be coupled between the first node N1 and a second node N2.

The control transistor Mc may be coupled between the second node N2 and a ground.

The control transistor Mc may perform an on-off operation, corresponding to a transistor control signal EN supplied from outside of the reference voltage supply unit 200, for example, from the timing controller 50.

In order to generate the internal voltage Vi during an initial driving period, the control transistor Mc may maintain an On state during the initial driving period.

Thus, the battery voltage Vb may be divided into the internal voltage Vi by the first and second resistors Ri1 and Ri2 during the initial driving period, and accordingly, the internal voltage Vi may be output from the first node N1 of the internal voltage generation unit 210.

The selection control unit 220 may receive the internal voltage Vi input from the internal voltage generation unit 210, and output a selection signal SEL corresponding to the level of the internal voltage Vi.

The selection control unit 220 may supply the selection signal SEL to the selection unit 250. The selection signal SEL may be a digital signal.

For example, a look-up table (e.g., a predetermined look-up table) in which selection signals SEL respectively corresponding to levels of the internal voltage are listed may exist in the selection control unit 220.

Thus, the selection control unit 220 may measure a level of the internal voltage, and output a selection signal SEL corresponding to the level of the internal voltage Vi with reference to the look-up table.

The selection unit 250 may receive a plurality of auxiliary voltages Vc1, Vc2, Vc3 and Vc4, and select one of the plurality of auxiliary voltages Vc1, Vc2, Vc3 and Vc4 as a reference voltage Vref, corresponding to the selection signal SEL supplied from the selection control unit 220. The selection unit 250 may supply the selected reference voltage Vref to an error AMP 130.

As the battery voltage Vb is changed, the internal voltage Vi may be changed. As the internal voltage Vi is changed, the selection signal SEL may also be changed.

Thus, the reference voltage Vref output from the selection unit 250 may be changed, and accordingly, the level of the first voltage ELVDD may also be changed.

In one embodiment, the plurality of auxiliary voltages Vc1, Vc2, Vc3 and Vc4 supplied to the selection unit 250 may be supplied from the auxiliary voltage generation unit 260.

To this end, the auxiliary voltage generation unit 260 may generate a plurality of auxiliary voltages Vc1, Vc2, Vc3 and Vc4 by dividing a specific voltage Vs, and supply the plurality of generated auxiliary voltages Vc1, Vc2, Vc3 and Vc4 to the selection unit 250.

For example, the auxiliary voltage generation unit 260 may include a plurality of ladder resistors Rd1, Rd2, Rd3, Rd4 and Rd5, to divide the specific voltage Vs into the plurality of auxiliary voltages Vc1, Vc2, Vc3 and Vc4.

Thus, the plurality of auxiliary voltages Vc1, Vc2, Vc3 and Vc4 may have a voltage level lower than that of the specific voltage Vs.

In an example, the selection unit 250 may receive the specific voltage Vs as well as the plurality of auxiliary voltages Vc1, Vc2, Vc3 and Vc4, and select the specific voltage Vs as the reference voltage Vref, corresponding to the selection signal SEL.

The operation of the reference voltage supply unit 200, according to one embodiment, will be described with reference to the following Table 1. In the following Table 1, the unit of each of the battery voltage Vb, the internal voltage Vi, the reference voltage Vref and the first voltage ELVDD is V (volt).

In the following Table 1, the embodiment in which the first resistor Ri1 included in the internal voltage generation unit 210 has a resistance three times greater than that of the second resistor Ri2 included in the internal voltage generation unit 210 will be described as an example. Thus, the level of the internal voltage Vi may be set to ¼ of that of the battery voltage Vb.

In addition, the embodiment in which the auxiliary voltages of 1.1500V, 1.1625V, 1.175V, 1.1875V and 1.2000V are supplied from the auxiliary voltage generation unit 260 to the selection unit 250 will be described as an example.

For example, when the battery voltage Vb is 4.150V, the internal voltage generation unit 210 may output an internal voltage Vi of 1.038V.

Thus, the selection control unit 220 may receive the internal voltage Vi of 1.038V, and output a selection signal SEL having a value of "000" corresponding to the received internal voltage.

As such, the selection control unit 220 may output the selection signal SEL having the value of "000" even when the battery voltage Vb is greater than 4.150V and less than (or smaller than or not greater than) 4.250V.

By the same principle, the selection control unit 220 may output the selection signal SEL having the value of "000" when the battery voltage Vb is not less than 4.250V and less than (or not greater than) 4.300V.

The selection control unit 220 may output a selection signal having a value of "010" when the battery voltage Vb is not less than 4.300V and less than 4.350V.

As a result, when receiving any one of the selection signal SEL having the value of "000" and the selection signal SEL having the value of "010", input from the selection control unit 220, the selection unit 250 may select and output the voltage of 1.1500V, from among the plurality of auxiliary voltages Vc1, Vc2, Vc3 and Vc4, as the reference voltage Vref.

For example, the selection control unit 220 may output a selection signal SEL having a value of "011" when the battery voltage Vb is not less than 4.350V and less than 4.400V.

Corresponding to this, the selection unit 250 may select and output the voltage of 1.1625V among the plurality of auxiliary voltages Vc1, Vc2, Vc3 and Vc4 as the reference voltage Vref.

Accordingly, the level of the first voltage ELVDD may be increased to 4.65V.

The other examples may be substantially similarly (e.g., identically) applied from the above description, and therefore, their descriptions may not be provided. Although, in the examples provided above with reference to FIG. 4 it has been described that the selection signal SEL is a 3-bit digital signal, the number of bits may be variously changed.

Figure 5:
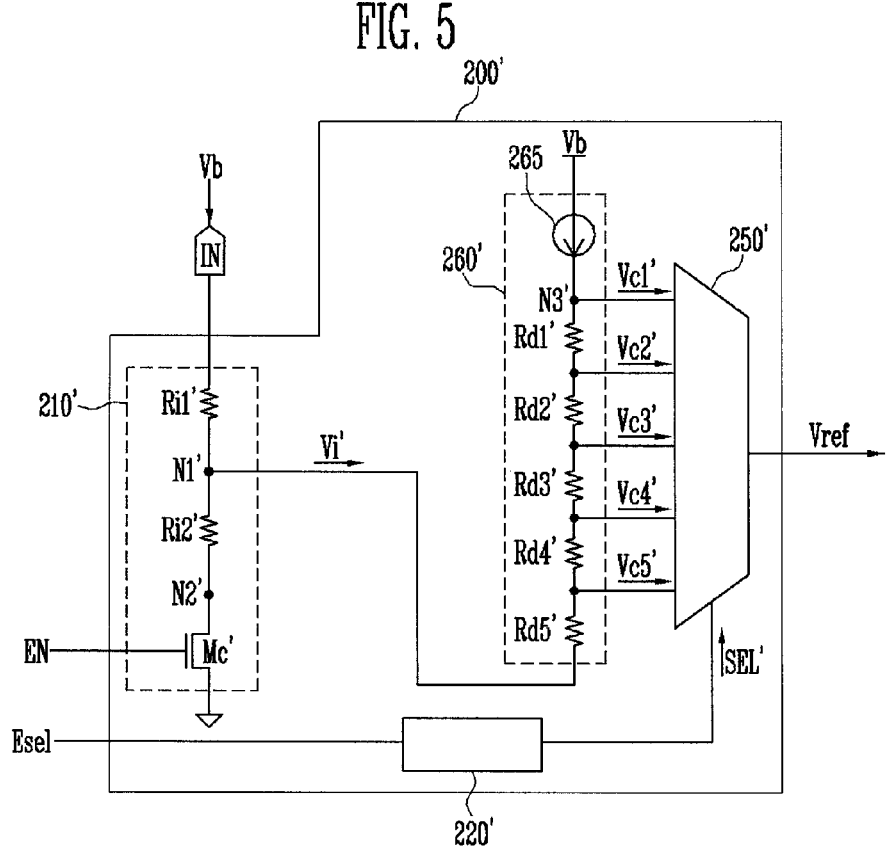
FIG. 5 is a schematic diagram illustrating a reference voltage supply unit, according to a second example embodiment of the present invention.

FIG. 5 is a schematic diagram illustrating a reference voltage supply unit, according to a second example embodiment of the present invention.

Referring to FIG. 5, the reference voltage supply unit 200' may include an internal voltage generation unit 210', a selection control unit 220', a selection unit 250' and an auxiliary voltage generation unit 260'.

The internal voltage generation unit 210' may generate an internal voltage Vi' by dividing the battery voltage Vb supplied to the input terminal IN of the DC-DC converter 60.

The internal voltage generation unit 210' may supply the generated internal voltage Vi' to the auxiliary voltage generation unit 260'.

To this end, the internal voltage generation unit 210' may include a first resistor Ri1', a second resistor Ri2' and a control transistor Mc'.

The first resistor may be coupled between the input terminal IN of the DC-DC converter 60 and a first node N1'.

The second resistor Ri2' may be coupled between the first node N1' and a second node N2'.

TABLE 1

| Battery Voltage Vb (V) | Internal Voltage Vi (V) | Selection Signal SEL | Reference Voltage Vref (V) | First Voltage ELVDD (V) |
|---|---|---|---|---|
| 4.150 ≤ Vb < 4.250 | 1.038 ≤ Vi < 1.063 | 000 | 1.1500 | 4.60 |
| 4.250 ≤ Vb < 4.300 | 1.063 ≤ Vi < 1.075 | 001 | 1.1500 | 4.60 |
| 4.300 ≤ Vb < 4.350 | 1.075 ≤ Vi < 1.088 | 010 | 1.1500 | 4.60 |
| 4.350 ≤ Vb < 4.400 | 1.088 ≤ Vi < 1.100 | 011 | 1.1625 | 4.65 |
| 4.400 ≤ Vb < 4.450 | 1.100 ≤ Vi < 1.113 | 100 | 1.1750 | 4.70 |
| 4.450 ≤ Vb < 4.500 | 1.113 ≤ Vi < 1.125 | 101 | 1.1875 | 4.75 |
| 4.500 ≤ Vb < 4.550 | 1.125 ≤ Vi < 1.138 | 110 | 1.2000 | 4.80 |

The control transistor Mc' may be coupled between the second node N2' and a ground.

The control transistor Mc' may perform an on-off operation, corresponding to a transistor control signal EN supplied from outside of the reference voltage supply unit 200', for example, from the timing controller 50.

In order to generate the internal voltage Vi' during an initial driving period, the control transistor Mc' may maintain an On state during the initial driving period.

Thus, the battery voltage Vb may be divided into the internal voltage Vi' by the first and second resistors Ri1' and Ri2' during the initial driving period, and accordingly, the internal voltage Vi' may be output from the first node N1' of the internal voltage generation unit 210'.

The selection control unit 220' may output a selection signal SEL', corresponding to an external control signal Esel supplied from the outside.

In one embodiment, the external control signal Esel may be supplied from the timing controller 50.

For example, the selection control unit 220' may count a number of pulses includes in the external control signal Esel, and output a selection signal SEL' corresponding to the number of pulses.

To this end, a look-up table (e.g., a set or predetermined look-up table) in which selection signals SEL' respectively corresponding to the number of pulses of the external control signal Esel are listed may exist in the selection control unit 220'.

Thus, the selection control unit 220' may count a number of pulses included in the external control signal Esel, and output a selection signal SEL' corresponding to the number of pulses with reference to the look-up table (e.g., the predetermined look-up table).

The selection unit 250' may receive a plurality of auxiliary voltages Vc1', Vc2', Vc3', Vc4' and Vc5', and select one of the plurality of auxiliary voltages Vc1', Vc2', Vc3', Vc4' and Vc5' as a reference voltage Vref, corresponding to the selection signal SEL' supplied from the selection control unit 220'. The selection unit 250' may supply the selected reference voltage Vref to the error AMP 130.

In an example, the plurality of auxiliary voltages Vc1', Vc2', Vc3', Vc4' and Vc5' supplied to the selection unit 250' may be supplied from the auxiliary voltage generation unit 260'.

The auxiliary voltage generation unit 260' may include a plurality of ladder resistors Rd1', Rd2', Rd3', Rd4' and Rd5' and a current source 265, to generate the plurality of auxiliary voltages Vc1', Vc2', Vc3', Vc4' and Vc5'.

The auxiliary voltage generation unit 260' may supply the plurality of generated auxiliary voltages Vc1', Vc2', Vc3', Vc4' and Vc5' to the selection unit 250'.

The plurality of ladder resistors Rd1', Rd2', Rd3', Rd4' and Rd5' may be coupled in series between the first node N1' and a third node N3'.

The current source 265 may supply a current (e.g., a predetermined current) to the third node N3'. Accordingly, the current may flow along the plurality of ladder resistors Rd1', Rd2', Rd3', Rd4' and Rd5'.

Thus, the plurality of voltages Vc1', Vc2', Vc3', Vc4' and Vc5' may be output through nodes existing between third node N3' and the plurality of ladder resistors Rd1', Rd2', Rd3', Rd4' and Rd5'.

Figure 6:
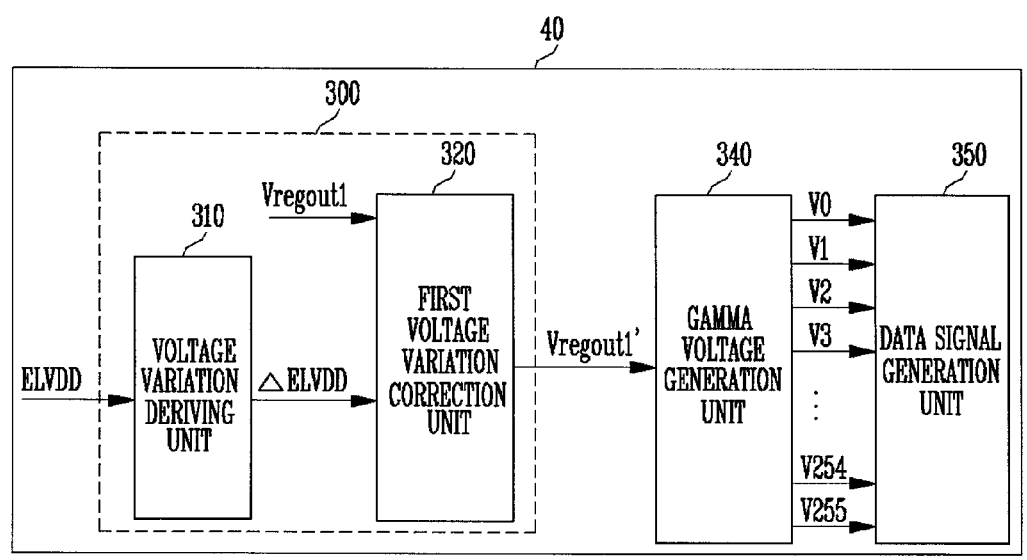
FIG. 6 is a schematic diagram illustrating an example of a data driver shown in FIG. 1, according to an example embodiment of the present invention.
Figure 7:
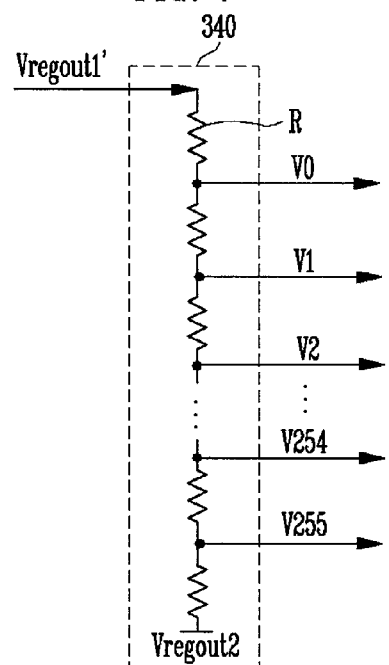
FIG. 7 is a schematic diagram illustrating an example of a gamma voltage generation unit shown in FIG. 6, according to an example embodiment of the present invention.

FIG. 6 is a schematic diagram illustrating an example of the data driver shown in FIG. 1, according to an example embodiment of the present invention. FIG. 7 is a schematic diagram illustrating an example of a gamma voltage generation unit shown in FIG. 6, according to an example embodiment of the present invention.

Referring to FIG. 6, the data driver 40 may include a driving voltage varying unit 300, a gamma voltage generation unit 340 and a data signal generation unit 350.

The gamma voltage generation unit 340 may generate a plurality of gamma voltages V0, V1, . . . , V255 from a first driving voltage Vregout1 and a second driving voltage Vregout2, or may generate the plurality of gamma voltages V0, V1, . . . , V255, using (e.g., utilizing) a first driving voltage Vregout1' corrected by the driving voltage varying unit 300 in a subsequent process.

The driving voltage varying unit 300 may correct the first driving voltage Vregout1 supplied to the gamma voltage generation unit 340, corresponding to a change in the first voltage ELVDD output from the DC-DC converter 60.

In one embodiment, the first driving voltage Vregout1 is corrected corresponding to the change in the first voltage ELVDD, so that it is possible to more efficiently remove a luminance variation caused by the change in the first voltage ELVDD.

For example, the driving voltage varying unit 300 may generate the first driving voltage Vregout1' corrected from the first driving voltage Vregout1.

In this example, the gamma voltage generation unit 340 generates the plurality of gamma voltages V0, V1, . . . , V255, using (e.g., utilizing) the corrected first driving voltage Vregout1' and the second driving voltage Vregout2.

The second driving voltage Vregout2 may have a voltage level different from that of the first driving voltage Vregout1 or the corrected first driving voltage Vregout1'.

Although it has been illustrated in FIG. 6 that the driving voltage varying unit 300 is included in the data driver 40, the driving voltage varying unit 300 may be positioned separately from the data driver 40.

According to one embodiment, the driving voltage varying unit 300 includes a voltage variation deriving unit 310 and a first voltage variation correction unit 320.

The voltage variation deriving unit 310 may calculate a difference between the first voltage ELVDD and a comparison voltage (e.g., a predetermined comparison voltage).

The comparison voltage is a voltage used (e.g., utilized) in the voltage variation deriving unit 310 in order to measure a variation ΔELVDD of the first voltage ELVDD.

According to an embodiment, a comparison voltage generation unit for generating the comparison voltage may exist. The comparison voltage generation unit may be included in the voltage variation deriving unit 310.

For example, when the first voltage ELVDD is 4.5V and the comparison voltage is 4.6V, the variation ΔELVDD of the first voltage ELVDD may become 0.1V.

However, the operation of the voltage variation deriving unit 310 is not limited thereto, and the voltage variation deriving unit 310 may convert the first voltage ELVDD into a digital value through an analog digital converter, and evaluate the variation ΔELVDD of the first voltage ELVDD by comparing the digital value of the first voltage ELVDD with that of the comparison voltage.

The first voltage variation correction unit 320 may generate the corrected first driving voltage Vregout1' by applying the variation ΔELVDD of the first voltage ELVDD obtained from the voltage variation deriving unit 310 to the first driving voltage Vregout1.

In an embodiment, the first driving Voltage Vregout1 and the second driving voltage Vregout2 are voltages for generating the plurality of gamma voltages V0, V1, . . . , V255. The first driving voltage Vregout1 and the second driving voltage Vregout2 may be obtained from different voltage sources, or be obtained by dividing different voltages applied from the DC-DC converter 60.

The variation ΔELVDD of the first voltage ELVDD, obtained from the voltage variation deriving unit 310 may be added/subtract to/from the first driving voltage Vregout1 to generate the corrected first driving voltage Vregout1'.

In an embodiment, the variation ΔELVDD of the first voltage ELVDD may be added to or subtracted from the first driving voltage Vregout1, to be reflected on the voltage levels of a plurality of data signals Data1, Data2, ..., Datam, which are finally generated.

For example, the variation ΔELVDD of the first voltage ELVDD may be (immediately) added to or subtracted from the first driving voltage Vregout1, or a driving voltage offset Vregout offset matched to the variation ΔELVDD of the first voltage ELVDD may be added to or subtracted from the first driving voltage Vregout1.

The driving voltage offset Vregout offset may be matched based on the variation ΔELVDD of the first voltage ELVDD to be implemented as a table. The driving voltage offset Vregout offset may be derived by an algorithm, and be derived by synthesizing a repetitive experiment result value.

However, a method of applying the variation ΔELVDD of the first voltage ELVDD to the first driving voltage Vregout1 is not limited thereto, and various mathematical and experimental methods may be applied.

The first driving voltage Vregout1 corrected by the first voltage variation correction unit 320 is supplied to the gamma voltage generation unit 340.

The gamma voltage generation unit 340 generates the plurality of gamma voltages V0, V1, ..., V255 from the corrected first driving voltage Vregout1' and the second driving voltage Vregout2.

Referring to FIG. 7, the gamma voltage generation unit 340 may include a plurality of resistors R coupled in series (e.g., connected in series), to generate the plurality of gamma voltages V0, V1, ..., V255 by dividing the corrected first driving voltage Vregout1' and the second driving voltage Vregout2 through the resistors R.

The gamma voltages V0, V1, ..., V255 generated by the gamma voltage generation unit 340 are applied to the data signal generation unit 350, and the gamma voltage generation unit 340 may generate different gamma voltages for the RGB data signals. The number of the plurality of gamma voltages V0, V1, ..., V255 may be changed depending on the configuration of a resistor string (R-string), and is not limited to 256.

Although it has been illustrated in FIG. 7 that the corrected first driving voltage Vregout1' has a different value from the first gamma voltage V0, the resistor string may be configured so that the corrected first driving voltage Vregout1' may be directly used (e.g., utilized) as the first gamma voltage V0. Although it has been illustrated in FIG. 7 that the second driving voltage Vregout2 has a different value from the last gamma voltage V255, the resistor string may be configured so that the second driving voltage Vregout2 may be directly used (e.g., utilized) as the last gamma voltage V255.

Figure 8:
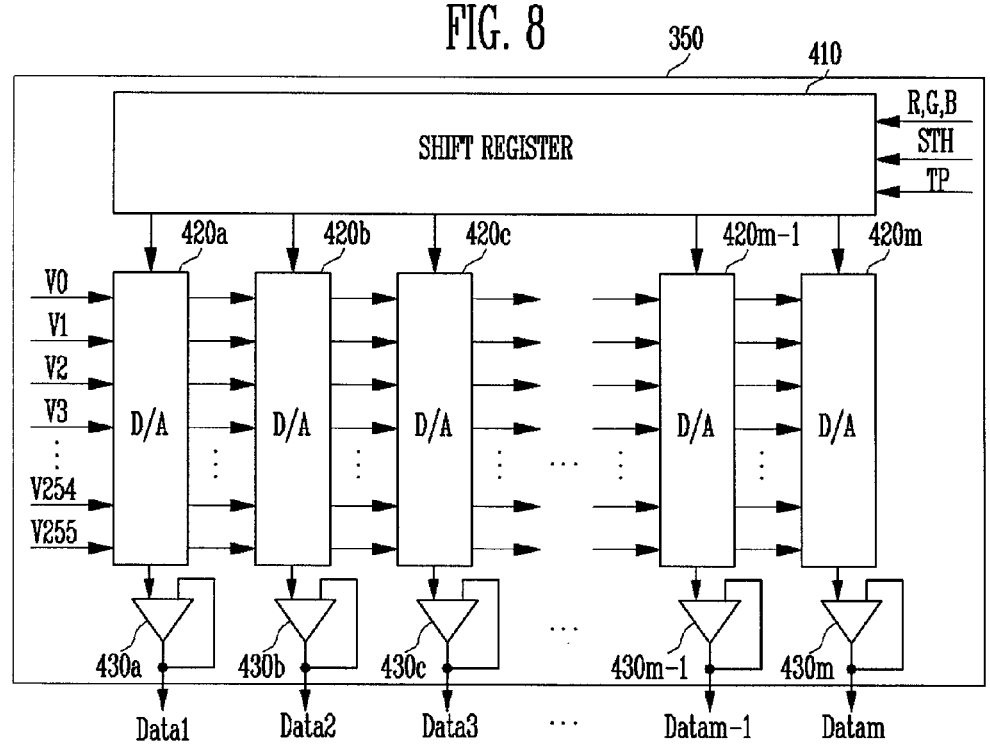
FIG. 8 is a schematic diagram illustrating an example of a data signal generation unit shown in FIG. 6, according to an example embodiment of the present invention.

FIG. 8 is a schematic diagram illustrating an example of the data signal generation unit shown in FIG. 6, according to an example embodiment of the present invention.

The data signal generation unit 350 may receive a plurality of gamma voltages V0, V1, ..., V255 applied from the gamma voltage generation unit 340.

The plurality of gamma voltages V0, V1, ..., V255 may be applied to a plurality of digital-analog converters 420a, 420b, ..., 420m.

The plurality of digital-analog converters 420a, 420b, ..., 420m may select gamma voltages corresponding to the RGB data signals R, G and B among the plurality of gamma voltages V0, V1, ..., V255 input from the gamma voltage generation unit 340, and output the selected gamma voltages respectively to a plurality of data signal output units 430a, 430b, 430c, ..., 430m.

In an example, a shift register 410 receives control signals STH and TP and the RGB data signals R, G and B, applied from the timing controller 50, to output the control signals STH and TP and the RGB data signals R, G and B to the plurality of digital-analog converters 420a, 420b, ..., 420m corresponding to the respective data lines.

The plurality of data signal output units 430a, 430b, 430c, ..., 430m may amplify the gamma voltages input from the digital-analog converters 420a, 420b, ..., 420m and output the data signals Data1, Data2, Datam to the respective data lines.

For example, the plurality of data signal output units 430a, 430b, 430c, ..., 430m may be implemented using (e.g., utilizing) a voltage follower.

By way of summation and review, according to embodiments of the present invention, it is possible to provide a DC-DC converter and an organic light emitting display device including the same in which a reference voltage is varied, thereby controlling the output voltage of the DC-DC converter.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and equivalents thereof.

What is claimed is:
1. A DC-DC converter, comprising:
a conversion unit configured to convert a battery voltage input to an input terminal of the DC-DC converter into a first voltage, and to output the first voltage to an output terminal of the DC-DC converter;
a feedback voltage generation unit configured to generate a feedback voltage by dividing the first voltage;
an error amplifier (AMP) configured to supply, to a pulse width modulation (PWM) control circuit, an error signal indicating a voltage difference between the feedback voltage and a reference voltage, the PWM control circuit being configured to control the conversion unit, corresponding to the error signal, thereby changing the first voltage; and
a reference voltage supply unit configured to receive the battery voltage, to supply the reference voltage to the error AMP according to the received battery voltage, and to change the reference voltage.
2. The DC-DC converter of claim 1, wherein the conversion unit comprises:

a first inductor coupled between the input terminal and a common node;
a first transistor coupled between the common node and a ground; and
a second transistor coupled between the common node and the output terminal.

3. A DC-DC converter, comprising:
a conversion unit configured to convert a battery voltage input to an input terminal of the DC-DC converter into a first voltage, and to output the first voltage to an output terminal of the DC-DC converter;
a feedback voltage generation unit configured to generate a feedback voltage by dividing the first voltage;
an error amplifier (AMP) configured to supply, to a pulse width modulation (PWM) control circuit, an error signal indicating a voltage difference between the feedback voltage and a reference voltage, the PWM control circuit being configured to control the conversion unit, corresponding to the error signal, thereby changing the first voltage; and
a reference voltage supply unit configured to supply the reference voltage to the error AMP, and to change the reference voltage,
wherein the reference voltage supply unit comprises:
an internal voltage generation unit configured to generate an internal voltage by dividing the battery voltage;
a selection control unit configured to receive the internal voltage from the internal voltage generation unit, and to output a selection signal corresponding to a level of the internal voltage; and
a selection unit configured to receive a plurality of auxiliary voltages, to select one auxiliary voltage of the plurality of auxiliary voltages corresponding to the selection signal as a reference voltage, and to supply the reference voltage to the error AMP.

4. The DC-DC converter of claim 3, wherein the reference voltage supply unit further comprises an auxiliary voltage generation unit configured to generate a plurality of auxiliary voltages by dividing a specific voltage, and to supply the generated auxiliary voltages to the selection unit.

5. The DC-DC converter of claim 3, wherein the internal voltage generation unit comprises:
a first resistor coupled between the input terminal and a first node;
a second resistor coupled between the first node and a second node; and
a control transistor coupled between the second node and a ground.

6. A DC-DC converter, comprising:
a conversion unit configured to convert a battery voltage input to an input terminal of the DC-DC converter into a first voltage, and to output the first voltage to an output terminal of the DC-DC converter;
a feedback voltage generation unit configured to generate a feedback voltage by dividing the first voltage;
an error amplifier (AMP) configured to supply, to a pulse width modulation (PWM) control circuit, an error signal indicating a voltage difference between the feedback voltage and a reference voltage, the PWM control circuit being configured to control the conversion unit, corresponding to the error signal, thereby changing the first voltage; and
a reference voltage supply unit configured to supply the reference voltage to the error AMP, and to change the reference voltage,
wherein the reference voltage supply unit comprises:
an internal voltage generation unit configured to generate an internal voltage by dividing the battery voltage;
a selection control unit configured to output a selection signal corresponding to an external control signal; and
a selection unit configured to receive a plurality of auxiliary voltages, to select one auxiliary voltage of the plurality of auxiliary voltages corresponding to the selection signal as a reference voltage, and to supply the reference voltage to the error AMP.

7. The DC-DC converter of claim 6, wherein the internal voltage generation unit comprises:
a first resistor coupled between the input terminal and a first node;
a second resistor coupled between the first node and a second node; and
a control transistor coupled between the second node and a ground.

8. The DC-DC converter of claim 7, wherein the reference voltage supply unit further comprises an auxiliary voltage generation unit comprising a plurality of ladder resistors coupled in series between the first node and a third node and a current source configured to supply a current to the third node, and configured to generate a plurality of auxiliary voltages.

9. The DC-DC converter of claim 6, wherein the selection control unit is configured to count a number of pulses in the external control signal and to output a selection signal corresponding to the number of pulses.

10. An organic light emitting display device, comprising:
a plurality of pixels coupled to scan lines and data lines;
a DC-DC converter configured to supply a first voltage to the pixels; and
a battery configured to supply a battery voltage to an input terminal of the DC-DC converter,
wherein the DC-DC converter comprises:
a conversion unit configured to convert the battery voltage into the first voltage, and to output the first voltage to an output terminal of the DC-DC converter;
a feedback voltage generation unit configured to generate a feedback voltage by dividing the first voltage;
an error AMP configured to supply, to a PWM control circuit, an error signal indicating a difference between the feedback voltage and a reference voltage,
the PWM control circuit being configured to control the conversion unit, corresponding to the error signal, and to change the first voltage during an initial driving period; and
a reference voltage supply unit configured to receive the battery voltage, to supply the reference voltage to the error AMP according to the received battery voltage, and to change the reference voltage during the initial driving period.

11. The organic light emitting display device of claim 10, wherein the pixels are configured to maintain a non-emission state during the initial driving period.

12. The organic light emitting display device of claim 10, wherein the reference voltage supply unit comprises:
an internal voltage generation unit configured to generate an internal voltage by dividing the battery voltage;

a selection control unit configured to receive the internal voltage from the internal voltage generation unit, and to output a selection signal corresponding to a level of the internal voltage; and a selection unit configured to receive a plurality of auxiliary voltages, to select one auxiliary voltage of the plurality of auxiliary voltages corresponding to the selection signal as a reference voltage, and to supply the reference voltage to the error AMP.

13. The organic light emitting display device of claim 12, wherein the reference voltage supply unit further comprises an auxiliary voltage generation unit configured to generate a plurality of auxiliary voltages by dividing a specific voltage, and to supply the generated auxiliary voltages to the selection unit.

14. The organic light emitting display device of claim 12, wherein the internal voltage generation unit comprises:
a first resistor coupled between the input terminal and a first node;
a second resistor coupled between the first node and a second node; and
a control transistor coupled between the second node and a ground, and configured to maintain an On state during the initial driving period.

15. The organic light emitting display device of claim 10, wherein the reference voltage supply unit comprises:
an internal voltage generation unit configured to generate an internal voltage by dividing the battery voltage;
a selection control unit configured to output a selection signal corresponding to an external control signal; and
a selection unit configured to receive a plurality of auxiliary voltages, to select one auxiliary voltage of the plurality of auxiliary voltages corresponding to the selection signal as a reference voltage, and to supply the reference voltage to the error AMP.

16. The organic light emitting display device of claim 15, wherein the internal voltage generation unit comprises:
a first resistor coupled between the input terminal and a first node;
a second resistor coupled between the first node and a second node; and
a control transistor coupled between the second node and a ground, and configured to maintain an On state during the initial driving period.

17. The organic light emitting display device of claim 16, wherein the reference voltage supply unit further comprises an auxiliary voltage generation unit comprises a plurality of ladder resistors coupled in series between the first node and a third node and a current source configured to supply a current to the third node, and configured to generate a plurality of auxiliary voltages.

18. The organic light emitting display device of claim 15, wherein the selection control unit is configured to count a number of pulses in the external control signal, and to output a selection signal corresponding to the number of pulses.

19. The organic light emitting display device of claim 10, wherein the conversion unit comprises:
a first inductor coupled between the input terminal and a common node;
a first transistor coupled between the common node and a ground; and
a second transistor coupled between the common node and the output terminal.

* * * * *